United States Patent
Louie

(10) Patent No.: US 10,185,386 B2
(45) Date of Patent: Jan. 22, 2019

(54) METHODS AND APPARATUS FOR CONTROLLING POWER CONSUMPTION OF A COMPUTING UNIT THAT EMPLOYS A DISCRETE GRAPHICS PROCESSING UNIT

(71) Applicant: ATI Technologies ULC, Markham (CA)

(72) Inventor: Wayne Chuck Louie, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 9 days.

(21) Appl. No.: 15/218,429

(22) Filed: Jul. 25, 2016

(65) Prior Publication Data
US 2018/0024612 A1    Jan. 25, 2018

(51) Int. Cl.
*G06F 1/32* (2006.01)
*G06F 12/00* (2006.01)

(52) U.S. Cl.
CPC .......... *G06F 1/3275* (2013.01); *G06F 1/3225* (2013.01); *G06F 12/00* (2013.01)

(58) Field of Classification Search
CPC .. G06F 1/3275; G06F 1/3287; G09G 2360/12
See application file for complete search history.

(56) References Cited

U.S. PATENT DOCUMENTS

| | | | |
|---|---|---|---|
| 7,100,013 B1* | 8/2006 | de Waal | G06F 1/3225 345/211 |
| 2003/0174137 A1* | 9/2003 | Leung | G09G 5/39 345/531 |
| 2008/0100636 A1* | 5/2008 | Lai | G09G 5/39 345/546 |
| 2011/0216078 A1 | 9/2011 | Blinzer | |

* cited by examiner

*Primary Examiner* — Albert Wang
(74) *Attorney, Agent, or Firm* — Faegre Baker Daniels LLP

(57) ABSTRACT

A method and apparatus controls power consumption of a computing unit by determining a discrete frame buffer memory usage condition, such as when there is little real 3D activity (or other condition). When the discrete frame buffer memory usage condition is favorable for power savings, the method and apparatus reduces power to at least one bank of discrete frame buffer memory during runtime of an associated discrete graphics processor. The associated discrete graphics processor uses a portion of a system memory's frame buffer memory instead of the at least one bank of discrete frame buffer memory during runtime of the discrete graphics processor. When a user runs more intense 3D programs, the apparatus and method dynamically enables the discrete frame buffer or portion thereof such as one or more banks and reverts from using the system memory back to using the discrete frame buffer memory.

16 Claims, 4 Drawing Sheets

METHODS AND APPARATUS FOR CONTROLLING POWER CONSUMPTION OF A COMPUTING UNIT THAT EMPLOYS A DISCRETE GRAPHICS PROCESSING UNIT

BACKGROUND OF THE DISCLOSURE

The disclosure relates generally to methods and apparatus for controlling power consumption of a computing unit.

Computing units such as servers, smart phones, tablets, game consoles, set top boxes, laptops, wearables, printers or other devices, includes, for example, system memory and one or more processors for processing data. As shown for example in FIG. 1, a computing unit 100 includes system memory 102 (e.g., flash memory, RAM, NVRAM or other suitable memory), a processor 104 (e.g., multicore CPU) that accesses system memory 102 through a bus control hub 106 as well as a discrete graphics processing unit (GPU) 107 that includes its own discrete frame buffer memory 108 (e.g., DDRAM, NVRAM or other suitable memory). The discrete frame buffer 108 is dedicated to the discrete GPU 107 in the sense that only the discrete GPU 107 has access to store and retrieve data with the discrete frame buffer 108. In some systems, an integrated graphics processing unit 110 is integrated with the processor 104 on a same mother board or in this example, on a same chip such as an accelerated processing unit (APU) chip as the processor 104. Integrated GPU 110 uses the system memory as its frame buffer such that the system memory 102 is shared by the integrated GPU and the processor 104. The system memory 102 is coupled to the processor 104 through one or more buses 114 through the bus control hub 106. The discrete graphics processing unit 107 can be on a separate chip or circuit board and communicates with the processor 104 through a suitable bus structure shown as 116.

In this example, the integrated graphics processing unit 110 provides frames of pixels for output to display 120 and/or 122 and the discrete GPU 107 provides frames of pixels for output to display 122 and/or 120. Systems operate to reduce power consumption where possible to help mobile devices and non-mobile devices save power. In conventional systems, the discrete graphics processing unit 107 and the corresponding discrete frame buffer 108 are turned on and off together through power control logic 121 to save power, for example, when an operating system 122, driver 126 or other mechanism determines that the system or portions thereof can enter a lower power state. As shown, the processor 104 executes operating system (OS) code, other software such as application code and driver code where the driver code when executed, serves as the driver 126 to interface with the integrated GPU 110 and the discrete GPU 107. The code is stored in memory 119 and executable by the processor 104 as known in the art. The memory 119 which can be, for example, ROM, hard drive, NVRAM or any other suitable memory, stores the requisite code that when executed by the processor 104 (and/or integrated GPU 110 or discrete GPU 107), operates as the operating system, driver, power control logic, application and other suitable code as desired.

The power control logic 121 provides power control information and controls power consumption of hardware components and portions thereof through power gating logic as known in the art. The power control logic 121, as known in the art includes the requisite logic to facilitate the reduction of voltage levels and/or clock frequencies to functional blocks of CPU and GPU cores to reduce power consumption and to increase power consumption when higher performance is required. In an example, the power states are compliant with various industry standards or any other suitable power savings scheme. The power control logic 121 although shown as a block inside the processor 104, can be spread across multiple components and includes the power gating logic in the CPU, GPU and memories as well as portions of the OS and driver. In one example, the operating system 122 controls power states of the CPU and informs the driver 126 to also control power states for the integrated GPU 110 and discrete GPU 107. The integrated GPU 110 and discrete GPU 107 can also provide power control on their own by detecting non-use of functional blocks without the use of the operating system. In one example, the driver notifies the OS of the intent to shut down power. The OS evicts data in memory from portions to be shut down to frame buffer memory banks that are to be left on and the driver is notified when eviction is complete. Typically during runtime of the discrete GPU 107, the discrete frame buffer 108 is also in an on-state.

The operating system 122 typically expects a discrete GPU 107 to have its discrete frame buffer 108 on at all times during discrete GPU runtime unless both the discrete GPU 107 and the discrete frame buffer 108 are shut off together for power savings. Stated another way, a discrete GPU and its corresponding discrete frame buffer are always operated in a same state. For example, when the discrete GPU 107 is in an off-state, then the discrete frame buffer 108 is in an off-state and when the discrete GPU 107 is in an on-state, then the discrete frame buffer 108 is in an on-state. This can result in unnecessary power usage.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Figure 1:
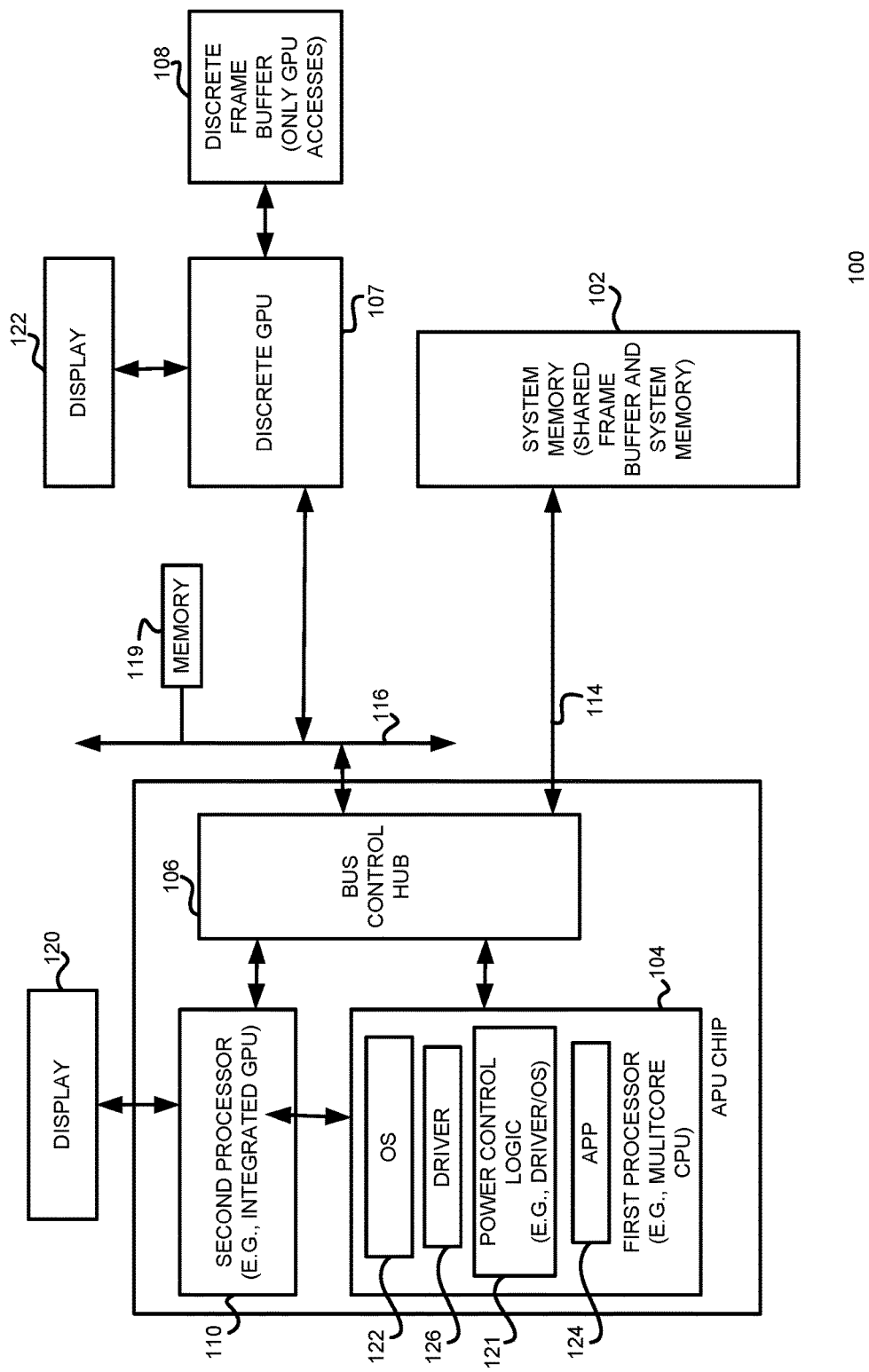
FIG. 1 is a block diagram of a prior art computing system.

Briefly, a method and apparatus controls power consumption of a computing unit by determining a discrete frame buffer memory usage condition, such as when there is little 3D activity by a graphics processing unit (or other condition). When the discrete frame buffer memory usage condition is favorable for power savings, the method and apparatus reduces power to at least one bank of discrete frame buffer memory during runtime of an associated discrete graphics processor. For example during system usage, when there is very little real 3D activity, the entire discrete frame buffer is disabled or one or more banks can be put in low power modes. The associated discrete graphics processor uses a portion of a system memory as its frame buffer memory instead of the at least one bank of discrete frame buffer memory during runtime of the discrete graphics processor. When a user runs more intense 3D programs, such as games, or video or other programs requiring GPU intensive processing, then the apparatus and method dynamically enables (increases power back to the discrete GPU) power control of the discrete frame buffer or portion thereof. The method and apparatus enables a dynamic enabling and disabling of some or all of the discrete frame buffer memory of the discrete graphics processing unit and instead uses system memory during discrete GPU runtime which can provide better power usage and allow better scaling with actual performance demands of the discrete GPU.

In one example, determining the discrete frame buffer memory usage condition can be performed by an operating system and/or a driver and/or discrete GPU or other component. If an operating system is used, it notifies a driver to reduce power to the at least one bank of a discrete frame buffer memory (e.g., portion thereof) during runtime of the associated discrete graphics processor and facilitates usage of the system memory as the frame buffer for the discrete GPU. When the discrete frame buffer usage condition indicates that more memory can be used, the method and apparatus increases power back to the at least one bank of discrete frame buffer memory during runtime of an associated graphics processor.

In another example, determining a discrete frame buffer memory usage condition is performed by a driver, instead of the operating system, or can be performed by any other suitable structure including the discrete GPU or other structure. When a driver is employed, the driver notifies the operating system that at least one bank of discrete frame buffer memory has been shut off during runtime and the OS avoids management of affected memory resources for the discrete frame buffer in response to notification and instead manages the relevant portions of the system memory.

In yet another example, applications that execute on a processor such as a CPU in the computing system includes frame buffer control data in a field of the application so that when the application is executed and the buffer control data is processed, the application can notify the operating system, driver or other element to shut down the discrete frame buffer or portions thereof during runtime of the discrete graphics processor (in an on-state as opposed to a standby or off-state) and use the system memory instead of the portions of the discrete frame buffer that are in a reduced power state.

Figure 2:
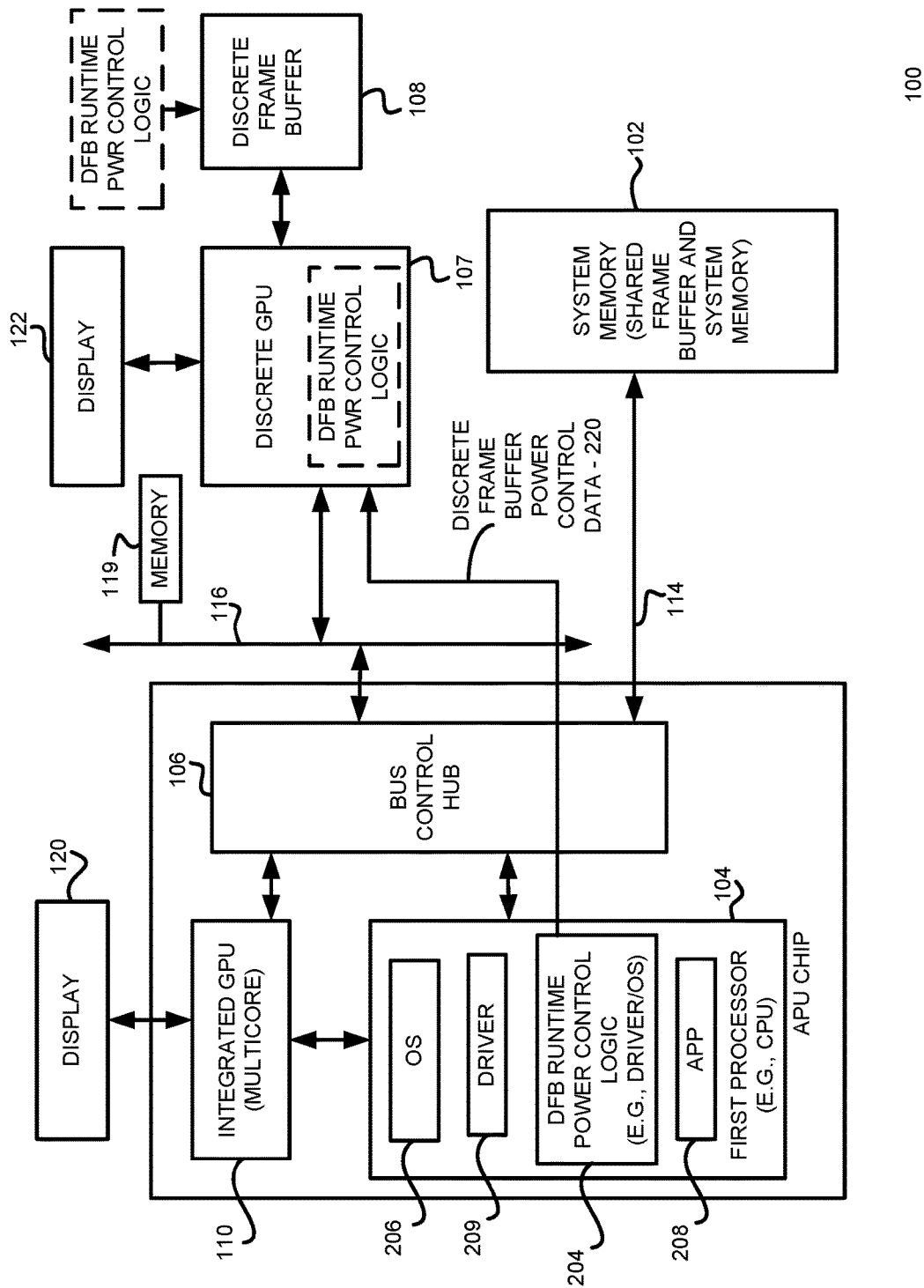
FIG. 2 is a block diagram of a computing system in accordance with one example set forth in the disclosure.

FIG. 2 illustrates one example of a computing unit 200 similar to that shown in FIG. 1 but includes discrete frame buffer runtime power control logic 204 which is included as part of the power control logic shown in FIG. 1 and is implemented on the processor 104 or as shown, in the discrete GPU or standalone logic and can be implemented as executing code on a processor, as a state machine, or as any other suitable combination of elements. In this example, the discrete frame buffer runtime power control logic 204 is operative to reduce power to at least one bank of the discrete frame buffer memory 108 during runtime of the discrete graphics processor 107, and performs the opposite approach of increasing power when the usage condition is favorable for a power increase. As part of the discrete frame buffer power reduction process, the system memory is (if needed) configured for use as the frame buffer for the discrete GPU. The discrete frame buffer runtime power control logic 204 causes the power to be reduced to at least one bank of the discrete frame buffer memory 108 through any suitable mechanism. In one example, the discrete GPU 107 can be controlled through register control or other suitable mechanism, to remove the power from the discrete frame buffer 108, or send control signals to the discrete frame buffer 108 and the discrete frame buffer 108 can include its own power gating logic on a per-memory bank basis to reduce power to a specific bank or group of banks or the entire discrete frame buffer if desired. In another example, the operating system 206 is notified that the discrete frame buffer has been shut off or power reduced using a call by the driver 209 to the OS 206.

Figure 3:
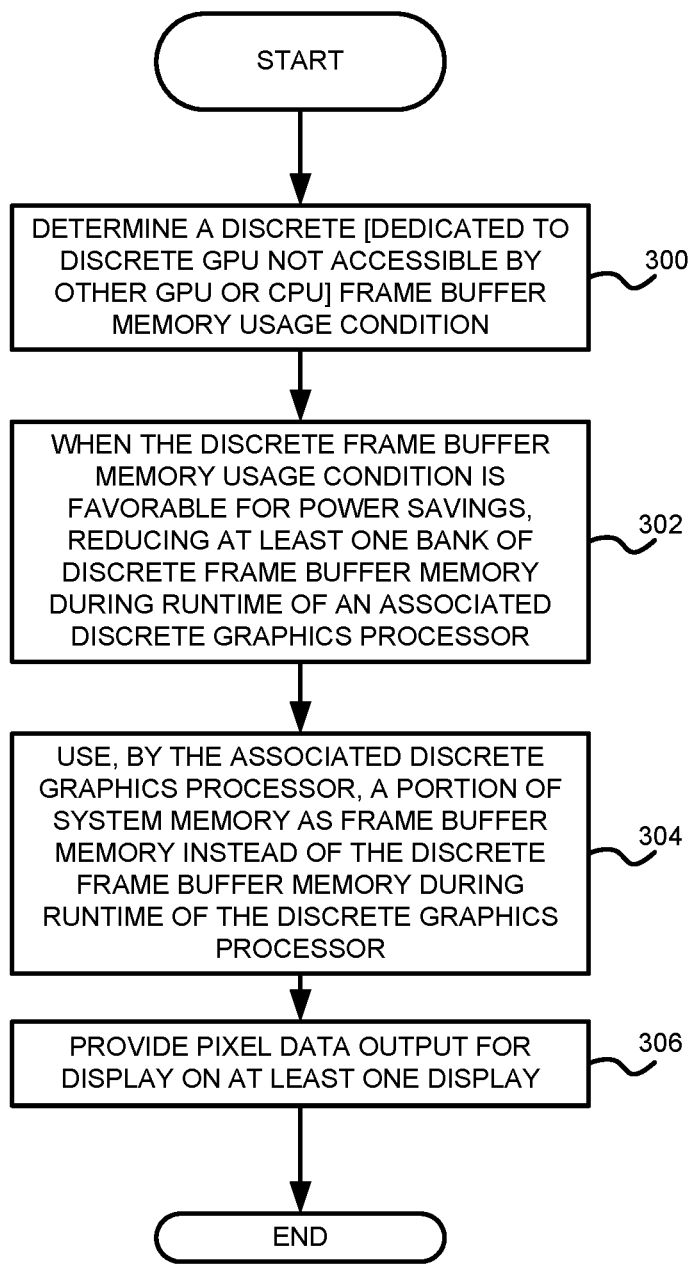
FIG. 3 is a flowchart illustrating one example of a method for controlling power consumption of a computing unit in accordance with one example set forth in the disclosure.

Referring also to FIG. 3, a method for controlling power consumption of a computing unit 200 will be described. As shown in block 300, the method includes determining a discrete frame buffer memory usage condition. In this example, this is done by the processor 104 through any suitable mechanism such as by the operating system 206, driver 209 or any other suitable component including the discrete GPU 107. For example, the operating system 206 or the driver 209, namely the portion of the driver acting as the discrete frame buffer runtime power control logic 204, can utilize a whitelist of games and applications that demand less memory, so the system starts with all memory enabled, or alternatively, have a blacklist of games and applications that would demand more memory, and so start with all or most memory disabled, and bring on extra memory only when the game or application starts. Further, during a game or application execution, the driver or OS records heuristics into the white or black list so that a future invocation would have a record of what would be best. The system makes changes when it needs to, and expects the changes to remain for a period of time measured in no less than "many seconds" but more likely "many minutes or hours". Both could be done (for example, half of the memory normally turned off, and turned on only for "big games and apps", and the other half itself divided into quarters or similar, and more quickly enable/disable portions based on GPU hardware hints (busy bits), size of commands from the game/OS to the driver, etc.

When it is determined by the driver 209 that there are no three dimensional graphics operations, 2D operations or any other operations being required of the discrete GPU 107, or when there are sufficient time periods where no memory requests for memory access are required of the discrete frame buffer 108, the discrete frame buffer runtime power control logic 204 causes power to one or more banks of the discrete frame buffer to be reduced such as shut off or lowered from a current level while the discrete graphics processor 107 is still in a runtime mode. Power control can include slowing down the clocks to memory banks, or idling or stopping the memory refresh, so that less power is used when that bank is not currently active, as in the quick on/off scenario, but re-enable memory refresh and thus higher power when it is quickly needed, as the memory does not need to be fully brought up (a long process, relatively), just refreshed (a short cycle). The discrete GPU 107 uses the system memory 102 instead of the discrete frame buffer memory 108. In another example, the driver 209 controlling the discrete GPU 107 and the integrated GPU 110, looks at the types of instruction blocks to determine, for example, whether higher order surfaces need to be computed by the discrete GPU 107 and if so, the discrete frame buffer 108 will be left on. The driver can also look at the totality of GPU core usage of the discrete GPU 107 and determine if only several cores within the discrete GPU 107 are needed. If so, the discrete frame buffer 108 or banks thereof are shut off and the system memory 102 is used by the several cores in the discrete GPU 107 during their runtime.

As noted, determining the discrete frame buffer memory usage condition can be performed by the processor 104 through the driver 209 (executing driver code on the processor) and the driver 209 notifies the operating system 206 that at least one bank of discrete frame buffer memory has been shut off during runtime. The operating system 206 avoids management of memory resources for the discrete frame buffer 108 in response to the notification that the discrete frame buffer memory has been shut off during runtime.

As shown in block 302, when the discrete frame buffer memory usage condition is favorable for power savings, the method includes reducing power to at least one bank of the discrete frame buffer memory 108 during runtime of the associated discrete graphics processor 107. For example, the discrete frame buffer runtime power control logic 204 (using power gating logic in the discrete frame buffer or using other logic to reduce power) shuts off power to the entire discrete frame buffer 108 in response to the discrete frame buffer memory usage condition being favorable for power savings. Alternatively, power to one or more banks is shut off or a power level is reduced to one or more banks or the entire discrete frame buffer memory 108.

In one example, the operating system 206 notifies the driver 209 which can be, for example, integrated as part of the discrete frame buffer runtime power control logic 204, to reduce power to at least one bank of discrete frame buffer memory 108 during runtime of the discrete graphics processor 107. When it is appropriate to increase power and use the discrete frame buffer 108, such as when the discrete GPU 107 is required to process video data (encode, decode, post process, etc.) or render 2D or 3D drawing commands, the discrete frame buffer runtime power control logic 204 is informed by the driver 209 or operation system 206 to increase power to at least one bank of the discrete frame buffer memory so that there is ample memory space available for the processing. Memory usage is transferred from system memory back to the discrete frame buffer or portion thereof. This includes, for example, when the entire discrete frame buffer 108 has been shut off, turning the discrete frame buffer back on during runtime of the discrete GPU 107 and reverting back from system memory to discrete frame buffer usage.

As shown in block 304, the discrete GPU 107 uses a portion of the system memory 102 when the discrete frame buffer has been shut off or bank thereof has been reduced in response to the favorable usage condition being detected and uses the system memory as frame buffer memory instead of the discrete frame buffer memory during runtime of the discrete graphics processor. As shown in block 306, the discrete graphics processor then provides pixel data output from the system memory 102 for display on at least one display 122 or 120. Instead of a real time analysis, a user can select to save power to shut off the use of the discrete frame buffer 108 through a suitable user interface thereby requiring the discrete GPU to use less discrete frame buffer memory, possibly requiring more use of the system memory 102 during runtime.

In yet another example of determining the discrete frame buffer memory usage condition, the application 208 is originally written to include frame buffer control data so that the processor 104, when executing the application 208 detects the frame buffer control data and sends a call to the operating system 206 or driver 209 to reduce power to at least one bank of discrete frame buffer memory during runtime of the associated discrete graphics processor. In another example, the driver 204 or OS 206 maintains a list of the applications that are running on the processor 104 and when a new application is instantiated, the driver 204 looks at the list of applications to determine which applications use the discrete frame buffer power control operation. For example, a database of applications is maintained by the driver 204 wherein some of the applications are designated so that the driver knows which applications can benefit from the frame buffer runtime power control logic. In this example, the application database, if it contains an application that can employ the discrete frame buffer power control mechanism, can allow the discrete frame buffer to be turned off and the discrete GPU to instead use the system memory 102 during runtime unless overridden by the operating system 206. The opposite can also be performed where a list of applications to increase memory.

Among other advantages, during the discrete graphics processor unit runtime, the power for the entire discrete frame buffer or the power to one or more memory of banks of the discrete frame buffer can be turned to a lower power operation and the discrete graphics processor uses the system memory 102 instead of the discrete frame buffer 108 as its frame buffer memory. When switching from use of the discrete frame buffer 108 to the system memory, the OS 206 allocates system memory space for this use and the driver copies the data from the discrete frame buffer to the system memory and informs the discrete GPU to display from the system memory frame buffer.

The operations described herein can be implemented in hardware such as processors executing stored instructions or other logic such as fixed function circuits including but not limited to state machines, field programmable gate arrays, application-specific circuits or other suitable hardware. Also, the operations described can be spread across different components as desired.

Figure 4:
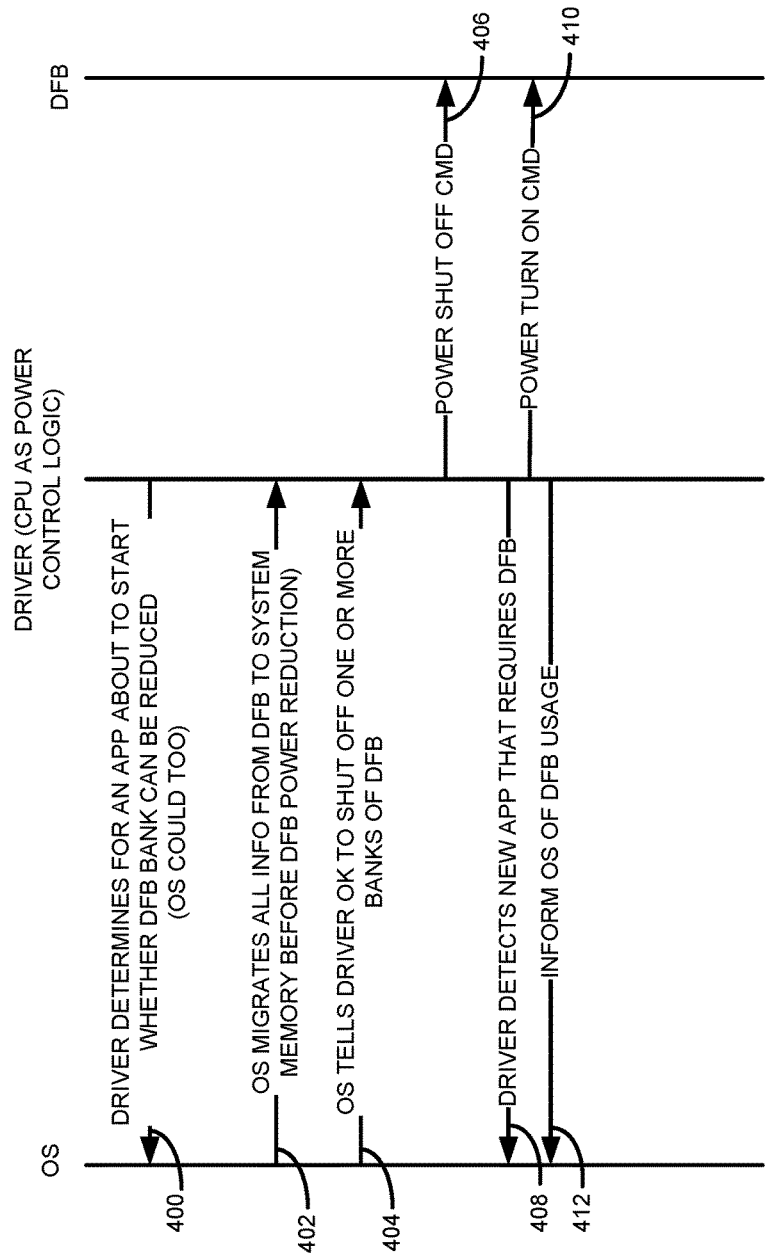
FIG. 4 is a communication diagram illustrating one example of a method for controlling power consumption of a computing unit in accordance with one example set forth in the disclosure.

FIG. 4 is a diagrammatic illustration of communication flow for an example where applications are evaluated to determine whether discrete frame buffer power control can be employed. The processor 104 through the driver 209, determines for an application about to start, whether the discrete frame buffer 108 can have its power reduced. For example, the driver 209 uses a list of applications apriori stored in memory 102 or 119, that includes application identifiers for those applications that will allow system memory to be used instead of a discrete frame buffer. This is shown by step 400. By way of example, below are some examples:

a. Applications that can reduce need for the discrete frame buffer (DFB):
  i. No 3D apps or video apps running at the moment.
  ii. Games based on DX8 or earlier. These typically do not require a lot of memory. They can be profiled.
  iii. "Windows Modern Apps" in Windows 8 and 10 that are "small footprint" (aka "Store Apps").
  iv. 2D games (those based on GDI or MFC, for example).
b. Applications that can demand more of DFB:
  i. DX12 games.
  ii. DX10/DX11 games some benefit from more memory, some do not.
  iii. DX9 games, but likely fewer compared to modern DFB sizes.

As shown in step 402, the operating system migrates all of the affected data (since some of the discrete frame buffer can remain powered on, depending on choices made at runtime) from the discrete frame buffer 108 to system memory 102 before the discrete frame buffer 108 has its power reduced and informs the driver 209 when complete. The OS can also inform the discrete frame buffer runtime power control logic 204 to shut off one or more banks of the discrete frame buffer 108 as shown in block 404. As shown in step 406, the discrete frame buffer runtime power control logic 204 then issues the discrete frame buffer power control data 220 such as a power shut off command or other information identifying the number of banks (or entire discrete frame buffer) that can be shut off or their power reduced to the discrete GPU 107 (or other logic that controls the power to the discrete frame buffer 108).

In step 408, the driver 209 detects a request to start a new application that requires discrete frame buffer operation, such as from the stored list or frame buffer control data embedded in the application and notifies the OS. The driver 209 then issues discrete frame buffer control data 220 that turns the power back on to the discrete frame buffer or relevant banks that had power reduced as shown in block 410. As shown in step 412, the driver informs the OS of the discrete frame buffer usage requirement so that the OS 206 can manage the discrete frame buffer 108 memory as known in the art.

If no applications require the use of the discrete frame buffer 108 while the discrete GPU is on (runtime of the discrete GPU) the driver issues discrete frame buffer power control data 220 to shut down the discrete frame buffer 108. The process is repeated as needed for each application that is executed.

When the discrete GPU 107 is using the system memory 102 for video or graphics processing operations instead of the discrete frame buffer 108, the driver 209 maintains a list of high intensity workloads such as those requiring real time video processing or graphics rendering wherein the driver 209 instructs the discrete GPU 107 to again use the discrete frame buffer 108 instead of the system memory 102. As noted above, this can include notifying the OS to allocate discrete frame buffer memory and manage the discrete frame buffer memory instead of system memory during the runtime of the discrete GPU.

Among other advantages, the method and apparatus enables a dynamic enabling and disabling of some or all of the discrete frame buffer memory of the discrete graphics processing unit and use of system memory during discrete GPU runtime instead of portions of or all of the discrete frame buffer which can provide better power usage and allow better scaling with actual performance demands of the discrete GPU.

The above detailed description and the examples described therein have been presented for the purposes of illustration and description only and not for limitation. For example, the operations described can be done in any suitable manner. The methods can be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method for controlling power consumption of a computing unit comprising:
   determining a discrete frame buffer memory usage condition;
   when the discrete frame buffer memory usage condition is favorable for power savings, reducing power to at least one bank of discrete frame buffer memory during runtime of an associated discrete graphics processor (GPU);
   using, by the associated discrete graphics processor, a portion of system memory as frame buffer memory instead of the at least one bank of the discrete frame buffer memory during runtime of the discrete graphics processor;
   wherein determining the discrete frame buffer memory usage condition is performed by at least one of: executing an application that comprises frame buffer control data that causes a call to an operating system or driver to reduce power to the at least one bank of discrete frame buffer memory during runtime of the associated discrete graphics processor and using data representing a list of applications that benefit from discrete frame buffer memory power reduction.

2. The method of claim 1 wherein reducing power to at least one bank of discrete frame buffer memory during runtime of an associated discrete graphics processor comprises shutting off power to the discrete frame buffer memory.

3. The method of claim 1 wherein determining the discrete frame buffer memory usage condition is performed by an operating system and wherein the method comprises notifying a driver to reduce power to the at least one bank of discrete frame buffer memory during runtime of the associated discrete graphics processor.

4. The method of claim 1 comprising increasing power to the at least one bank of discrete frame buffer memory during runtime of an associated discrete graphics processor in response to the discrete frame buffer memory usage condition indicating a power increase condition.

5. The method of claim 1 wherein determining the discrete frame buffer memory usage condition is performed by a driver and wherein the method comprises notifying, by the driver, an operating system (OS) that the at least one bank of discrete frame buffer memory has been shut off during runtime of the discrete GPU and wherein the method includes the OS avoiding management of memory resources for the discrete frame buffer in response to the notification.

6. A computing apparatus comprising:
   system memory;
   a first processor, operatively coupled to the system memory;
   a discrete graphics processor operatively coupled to the first processor;
   discrete frame buffer memory, operatively coupled to the discrete graphics processor; and
   power control logic, operatively coupled to the discrete frame buffer memory;
   wherein at least one of the first processor and the discrete graphics processor is operative to determine a discrete frame buffer memory usage condition;
   when the discrete frame buffer memory usage condition is favorable for power savings, the power control logic operative to reduce power to at least one bank of the discrete frame buffer memory during runtime of the discrete graphics processor;
   the discrete graphics processor operative to use a portion of the system memory as frame buffer memory instead of the at least one bank of the discrete frame buffer memory during runtime of the discrete graphics processor;
   wherein the determining the discrete frame buffer memory usage condition is performed by at least one of: the first processor executing an application that comprises frame buffer control data that causes a call to an operating system or driver to reduce power to the at least one bank of discrete frame buffer memory during runtime of the associated discrete graphics processor and using data representing a list of applications that benefit from discrete frame buffer memory power reduction.

7. The computing unit of claim 6 wherein the power control logic is operative to shut off power to the entire discrete frame buffer memory in response to the discrete frame buffer memory usage condition being favorable for power savings.

8. The computing unit of claim 6 wherein the first processor executes an operating system and wherein the operating system is operative to notify a driver associated with the discrete graphics processor to reduce power to the at least one bank of discrete frame buffer memory during runtime of the discrete graphics processor.

9. The computing unit of claim 6 wherein the power control logic is operative to increase power to the at least one bank of discrete frame buffer memory during runtime of the discrete graphics processor in response to the discrete frame buffer memory usage condition indicating a power increase condition.

10. The computing unit of claim 6 wherein the discrete graphics processor is operative to provide pixel data output for display on at least one display.

11. The computing unit of claim 6 wherein the determining the discrete frame buffer memory usage condition is performed by the first processor executing driver code and wherein the executing driver code notifies an operating system (OS) that the at least one bank of discrete frame buffer memory has been shut off during runtime of the discrete GPU and wherein the OS avoids management of memory resources for affected portions of the discrete frame buffer in response to the notification.

12. A non-transitory computer readable medium product comprising:
    stored executable instructions that when executed by one or more processors causes the one or more processors to:
    determine a discrete frame buffer memory usage condition;
    when the discrete frame buffer memory usage condition is favorable for power savings, reduce power to at least one bank of discrete frame buffer memory during runtime of an associated discrete graphics processor (GPU);
    cause the associated discrete graphics processor to use a portion of system memory as frame buffer memory instead of the at least one bank of the discrete frame buffer memory during runtime of the discrete graphics processor;
    stored executable instructions that when executed by one or more processors causes the one or more processors to determine the discrete frame buffer memory usage by at least one of: executing an application that comprises frame buffer control data that causes a call to an operating system or driver to reduce power to the at least one bank of discrete frame buffer memory during runtime of the associated discrete graphics processor and using data representing a list of applications that benefit from discrete frame buffer memory power reduction.

13. The non-transitory computer readable medium product of claim 12 comprising:
    stored executable instructions that when executed by one or more processors causes the one or more processors to reduce power to at least one bank of discrete frame buffer memory during runtime of the associated discrete graphics processor by shutting off power to the discrete frame buffer memory.

14. The non-transitory computer readable medium product of claim 12 comprising:
    stored executable instructions that when executed by one or more processors causes the one or more processors to determine the discrete frame buffer memory usage condition using by an operating system and notifying a driver to reduce power to the at least one bank of discrete frame buffer memory during runtime of the associated discrete graphics processor.

15. The non-transitory computer readable medium product of claim 12 comprising:
    stored executable instructions that when executed by one or more processors causes the one or more processors to increase power to the at least one bank of discrete frame buffer memory during runtime of an associated discrete graphics processor in response to the discrete frame buffer memory usage condition indicating a power increase condition.

16. The non-transitory computer readable medium product of claim 12 comprising:
    stored executable instructions that when executed by one or more processors causes the one or more processors to use a driver to notify an operating system (OS) that the at least one bank of discrete frame buffer memory has been shut off during runtime of the discrete GPU and causes the OS to avoid management of affected memory resources for the discrete frame buffer in response to the notification.

* * * * *